United States Patent
Selvaraj et al.

(10) Patent No.: US 12,341,398 B2
(45) Date of Patent: Jun. 24, 2025

(54) VOLTAGE OPTIMIZATION TECHNIQUE FOR A PERMANENT MAGNET MOTOR USED IN AN ELECTRIC SUBMERSIBLE PUMP

(71) Applicant: Toshiba International Corporation, Houston, TX (US)

(72) Inventors: Goutham Selvaraj, Houston, TX (US); Yao Duan, Houston, TX (US); Yu Liu, Houston, TX (US); Mark Rayner, Houston, TX (US)

(73) Assignee: Toshiba International Corporation, Houston, TX (US)

( * ) Notice: Subject to any disclaimer, the term of this patent is extended or adjusted under 35 U.S.C. 154(b) by 223 days.

(21) Appl. No.: 18/355,057

(22) Filed: Jul. 19, 2023

(65) Prior Publication Data

US 2023/0361645 A1 Nov. 9, 2023

Related U.S. Application Data

(62) Division of application No. 16/839,659, filed on Apr. 3, 2020, now Pat. No. 11,750,057.

(60) Provisional application No. 62/829,271, filed on Apr. 4, 2019.

(51) Int. Cl.
| | | |
|---|---|---|
| H02K 5/132 | (2006.01) | |
| E21B 43/12 | (2006.01) | |
| F04B 49/06 | (2006.01) | |
| F04C 13/00 | (2006.01) | |
| F04D 15/00 | (2006.01) | |
| H02P 6/08 | (2016.01) | |
| H02P 25/022 | (2016.01) | |

(52) U.S. Cl.
CPC ............ *H02K 5/132* (2013.01); *E21B 43/128* (2013.01); *F04B 49/06* (2013.01); *F04C 13/008* (2013.01); *F04D 15/0066* (2013.01); *H02P 6/08* (2013.01); *H02P 25/022* (2013.01)

(58) Field of Classification Search
CPC ....... H02K 5/132; E21B 43/128; F04B 49/06; F04C 13/008; F04C 14/00; H02P 6/08; H02P 1/426; H02P 9/44; H02P 21/09; H02P 25/024; H02P 27/04
See application file for complete search history.

(56) References Cited

U.S. PATENT DOCUMENTS

2015/0002067 A1  1/2015  Nondahl et al.
2017/0138159 A1  5/2017  Hoyte et al.

FOREIGN PATENT DOCUMENTS

WO    WO-2016148715 A1 *  9/2016

* cited by examiner

*Primary Examiner* — Said Bouziane
(74) *Attorney, Agent, or Firm* — Baker Botts L.L.P.

(57) ABSTRACT

A method for controlling a permanent magnet (PM) synchronous motor in an ESP application is provided. A load angle of the PM motor is estimated. A voltage adjustment value is determined for the PM motor based at least on the estimated load angle of the PM motor. A voltage to be applied to the PM motor is determined based on the voltage adjustment value.

7 Claims, 4 Drawing Sheets

VOLTAGE OPTIMIZATION TECHNIQUE FOR A PERMANENT MAGNET MOTOR USED IN AN ELECTRIC SUBMERSIBLE PUMP

CROSS-REFERENCE TO RELATED APPLICATION

This application is a divisional application of U.S. application Ser. No. 16/839,659, filed on Apr. 3, 2020, entitled "VOLTAGE OPTIMIZATION TECHNIQUE FOR A PERMANENT MAGNET MOTOR USED IN AN ELECTRIC SUBMERSIBLE PUMP" which claims priority to U.S. Provisional Application Ser. No. 62/829,271, entitled "VOLTAGE OPTIMIZATION TECHNIQUE FOR HIGH EFFICIENCY CONTROL OF ELECTRIC SUBMERSIBLE PUMP WITH PERMANENT MAGNET MOTOR", filed on Apr. 4, 2019, the entire disclosures of which are incorporated by reference herein.

TECHNICAL FIELD

Aspects of the present disclosure relate to controlling a permanent magnet (PM) synchronous motor and, more particularly, to a voltage optimization technique for a PM motor used in electric submersible pump (ESP) applications.

BACKGROUND

Submersible pump assemblies are used to artificially lift fluid from underground formations, such as oil, natural gas and/or water wells, to the surface. These wells are typically thousands of feet deep, with the pump assembly placed inside the deep well. A typical electric submersible pump (ESP) assembly consists, from bottom to top, of an electric motor, seal section, pump intake and centrifugal pump, which are all connected together with shafts. The electric motor supplies torque to the shafts, which provides power to the centrifugal pump. The electric motor is generally connected by a power cable to a power source located at the surface of the well. The power cable includes a motor lead assembly and downhole cable and extends from the downhole motor deep within the well to a transformer connected to a power generating system at the surface of the well. These ESP power cables are typically between about 4,000 to 12,000 feet or even longer in length, depending on well depth, since the cable must extend from deep within the well to the surface where the power source is located.

The ESP power generating system typically includes a variable speed drive (VSD) that is connected to an electrical grid. The VSD is located at the surface of a well that employs the ESP assembly. The VSD, also sometimes called a variable-frequency drive, adjustable frequency drive, AC drive, micro drive or inverter drive, is an adjustable speed drive used to control the speed and torque of the ESP induction motor by varying motor input frequency and voltage. The variable speed drive is generally connected to a drive controller that controls the amount of voltage and current delivered to the electric motor to ensure that the motor is operated at or near its maximum rated efficiency. Traditional implementations of the ESP assemblies include induction motors for powering the centrifugal pump of the ESP. However, ESP assemblies using permanent magnet (PM) synchronous motors to power the ESP have become popular over the years due to the relative compact construction and higher efficiency of operation of PM synchronous motors. However, PM motors are more challenging to operate at high efficiencies as compared to induction motors owing to their different design and principle of operation. Additionally, the fact that the PM motor in an ESP application is generally placed thousands of feet beneath the surface adds to the complexity in controlling the PM motor. Accordingly, systems and techniques are needed to control operation of PM motors in ESP applications such that the PM motor is operated at or near the motor's maximum rated efficiency.

SUMMARY

Certain aspects of the present disclosure provide a method for controlling a PM synchronous motor. The method generally includes estimating a load angle of the PM motor; determining a voltage adjustment value for the PM motor based at least on the estimated load angle of the PM motor; and determining a voltage to be applied to the PM motor based on the voltage adjustment value.

In an aspect, estimating the load angle includes estimating a rotor angle of the PM motor, wherein the rotor angle corresponds to an induced electromagnetic field (EMF) within the PM motor; obtaining an open loop reference angle of the PM motor, wherein the reference angle corresponds to a terminal voltage of the PM motor; and calculating the load angle as a difference between the open loop reference angle and the rotor angle.

In an aspect, the method further includes estimating the rotor angle of the PM motor based on a current being applied to the PM motor and a voltage being applied to the PM motor.

In an aspect, the method further includes determining an estimated speed of the PM motor based on a current being applied to the PM motor and a voltage being applied to the PM motor.

In an aspect, determining the voltage adjustment value for the PM motor includes detecting that the estimated load angle has decreased from a previous estimate of the load angle; and in response, determining a negative voltage adjustment value to lower the voltage being applied to the PM motor and increase the load angle of the PM motor to a predetermined value.

In an aspect, determining the voltage adjustment value for the PM motor includes detecting that the estimated load angle has increased from a previous estimate of the load angle; and in response, determining a positive voltage adjustment value to raise the voltage being applied to the PM motor and decrease the load angle of the PM motor to a predetermined value.

In an aspect, the method further includes estimating a power factor related to the PM motor, wherein the power factor is indicative of a level of efficiency of operation of the PM motor, wherein the voltage adjustment value for the PM motor is determined based on a combination of the estimated load angle and the estimated power factor.

In an aspect, estimating the power factor includes calculating the power offset based on a current being applied to the PM motor and an open loop reference angle of the PM motor, wherein the reference angle corresponds to a terminal voltage of the PM motor.

In an aspect, determining the voltage adjustment value for the PM motor includes detecting that the estimated load angle has decreased from a previous estimate of the load angle; detecting that the estimated power factor has fallen below a predetermined value or a predetermined range of values; and in response, determining a negative voltage adjustment value to lower the voltage being applied to the PM motor and increase the load angle of the PM motor to cause the power factor to increase to the predetermined value or to a value within the predetermined range of values.

In an aspect, determining the voltage adjustment value for the PM motor includes detecting that the estimated load angle has increased from a previous estimate of the load angle; detecting that the estimated power factor has increased above a predetermined value or a predetermined range of values; and in response, determining a positive voltage adjustment value to raise the voltage being applied to the PM motor and decrease the load angle of the PM motor to cause the power factor to decrease to the predetermined value or to a value within the predetermined range of values.

Certain aspects of the present disclosure provide a system. The system generally includes an electric submersible pump (ESP) comprising a permanent magnet (PM) motor; an adjustable speed drive (ASD) for powering the PM motor; a step-up transformer connected to an output of the ASD, the step-up transformer converting the a low voltage output from the ASD into a higher voltage output to be applied to the PM motor; an elongated electric cable extending between the step-up transformer and the ESP, the cable carrying electric power from the step-up transformer to the PM motor; and a control module for controlling an amount of voltage applied to the PM motor. The control module generally includes a load angle extraction component configured to estimate a load angle of the PM motor; a dynamic voltage compensation component configured to determine a voltage adjustment value for the PM motor based at least on the estimated load angle of the PM motor; and a scalar control module configured to determine a voltage to be applied to the PM motor based on the voltage adjustment value.

In an aspect, the control module includes a sliding mode observer component configured to estimate a rotor angle of the PM motor, wherein the rotor angle corresponds to an induced electromagnetic field (EFM) within the PM motor, wherein the load angle extraction component is configured to obtain an open loop reference angle of the PM motor, wherein the reference angle corresponds to a terminal voltage of the PM motor, wherein the load angle extraction component is configured to calculate the load angle as a difference between the open loop reference angle and the rotor angle.

In an aspect, the sliding mode observer component is configured to estimate the rotor angle of the PM motor based on a current being applied to the PM motor and a voltage being applied to the PM motor.

In an aspect, the sliding mode observer is further configured to determine an estimated speed of the PM motor based on a current being applied to the PM motor and a voltage being applied to the PM motor.

In an aspect, the system further includes a power factor calculation component for estimating a power factor related to the PM motor, wherein the power factor is indicative of a level of efficiency of operation of the PM motor.

In an aspect, the dynamic voltage compensation component is configured to determine the voltage adjustment value for the PM motor based on a combination of the estimated load angle and the estimated power factor.

In an aspect, the power factor calculation component calculates the power factor based on a current being applied to the PM motor and an open loop reference angle of the PM motor, wherein the reference angle corresponds to a terminal voltage of the PM motor.

Certain aspects of the present disclosure provide a computer-readable medium for storing instructions which when processed by at least one processor perform a method for controlling a permanent magnet (PM) synchronous motor. The method generally includes estimating a load angle of the PM motor; determining a voltage adjustment value for the PM motor based at least on the estimated load angle of the PM motor; and determining a voltage to be applied to the PM motor based on the voltage adjustment value.

In an aspect, estimating the load angle includes estimating a rotor angle of the PM motor, wherein the rotor angle corresponds to an induced electromagnetic field (EFM) within the PM motor; obtaining an open loop reference angle of the PM motor, wherein the reference angle corresponds to a terminal voltage of the PM motor; and calculating the load angle as a difference between the open loop reference angle and the rotor angle.

In an aspect, the computer-readable medium further includes instructions for estimating a power factor related to the PM motor, wherein the power factor is indicative of a level of efficiency of operation of the PM motor, wherein the voltage adjustment value for the PM motor is determined based on a combination of the estimated load angle and the estimated power factor.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
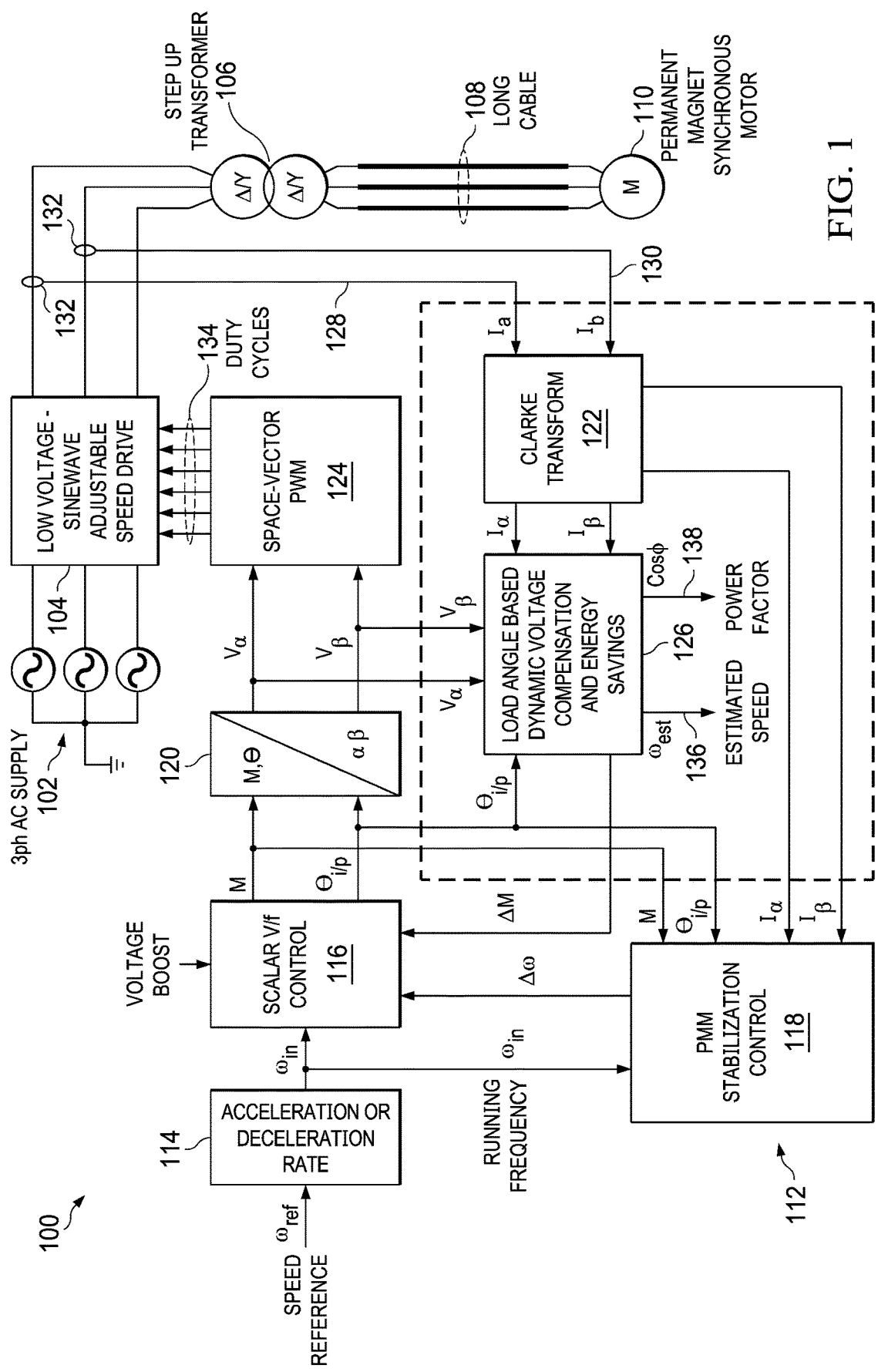
FIG. 1 is a schematic block diagram of an electric submersible pump (ESP) system that provides dynamic voltage compensation via a load angle estimation, in accordance with certain aspects of the present disclosure.

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

Two popular approaches for controlling a PM synchronous motor for non-ESP applications include a scalar volts (V)/frequency (Hz) control technique and a vector control technique. However, these conventional techniques may not work well for controlling a PM motor in ESP downhole applications as ESP systems are far more complicated. In ESP downhole applications, the ESP having the PM motor is generally located thousands of feet (e.g., 10,000 feet or more) in to the downhole, with a long cable (e.g., electric cable) connecting the ESP to the adjustable speed drive (ASD) at the surface level which powers the motor. The long cable generally causes a significant voltage drop mainly as a result of resistance and inductance effects related to the long cable. Accordingly, PM motors with medium voltage ratings (e.g., 2000 volts up to 4000 volts) are generally chosen for downhole ESP applications. In order to deliver the medium voltage levels to the motor, a step-up transformer is generally used to step-up the voltage output from the ASD before transmitting the same via the long cable to the PM motor. Further, the ASD for long cable downhole ESP applications generally includes a sine wave filter that converts the switching voltages from the ASD to a sinusoidal smooth waveform that is communicated through the transformer and the long cable to the PM motor.

Due to this complicated setup, the control of the PM motor is relatively complicated in the context of ESP applications. For example, obtaining sensor data (e.g., data from speed sensor, voltage sensor, current sensor etc.) for use in controlling the PM motor is generally not practical as it is not practical to provide sensors at the PM motor in the downhole location and transport sensor data all the way to the surface. Thus, the PM motor control may need to be sensor less control. As a result, the actual current and voltage values applied at the motor terminals are generally not available. Thus, there is no way of knowing how much voltage and energy is actually being applied to the motor at the motor terminals.

Additionally, the principle of operation of a PM synchronous motor makes it even more complicated to control and maintain high efficiency of operation. Unlike an induction motor, a PM synchronous motor is a non-self-starting motor. Thus, operating the PM motor using the conventional high efficiency vector control involves complex starting methodologies using high frequency injection techniques. However, due to the presence of the sine wave filter at the inverter output in ESP application, these starting techniques cannot be used to start the PM motor in vector control. In addition, due to the presence of the sine wave filter, step up transformer and the long cable in between the drive and the PM motor, the vector control needs to have multi cascaded control loops to compensate the voltage drop across each system component and also to control the PM motor torque and speed at its maximum efficiency. This makes the vector control extremely complicated for controlling PM motor in ESP applications. Additionally, the stability of the system under vector control is generally very sensitive to disturbances, which can lead to poor performance. Further, it is difficult to accurately estimate the rotor position, flux and torque of the motor as needed to provide the vector control.

The scalar V/Hz control is another control technique used in ESP application mainly for controlling the Induction motor. However, due to its simple sensor less control structure and its ability to start the PM motor without any complex starting techniques, scalar control is also used widely to control the PM motor in ESP applications.

When controlling an induction motor using scalar control, the ratio between applied voltage and frequency (V/Hz) is kept constant so that the flux of the induction motor is constant. This enables the control to achieve constant torque operation for induction motor. However, the PM motor has its own permanent magnet field, so using conventional scalar control to operate PM motor may lead to energy wastage and poor efficiency. For example, if a scalar V/Hz control is used to apply a rated voltage at rated frequency (ratio: $V_{rated}/F_{rated}$) to the PM motor, the motor may draw high load current even if there is no load applied to the motor. This leads to energy wastage and poor motor efficiency at no load and light load conditions. On the other hand, if a lower amount of voltage is being applied to the PM motor and an additional load is subsequently applied, the voltage drop across the motor terminals and the long cable increases due to the additional current being drawn by the motor because of the additional load. This voltage drop may cause the PM motor to step out from rotor synchronization with stator and may cause damage to the shaft of the PM motor. This voltage drop needs to be compensated by applying a higher voltage to the motor terminals when the additional load is being applied. Thus, the amount of voltage being applied to the PM motor needs to be optimized based on the amount of load applied to the motor. However, as noted above, the actual voltage values at the motor terminals are generally not available, which makes compensating for the voltage drop complicated. For example, when a conventional scalar V/Hz control is used to apply a rated voltage at rated frequency (ratio: $V_{rated}/F_{rated}$) which is referred to the drive output terminals, this voltage is then stepped up by the transformer (e.g., based on a linear transformation) and applied to the motor terminals. Since there may be no sensor feedback from the PM motor, sensor data on the actual amount of voltage and current at the motor terminals in the downhole may not be available, and thus, there is no way for the control system to know when the amount of load applied to the motor decreases. This may lead to a higher than needed voltage being applied to the motor terminals leading to energy wastage. Alternatively, when an additional load is applied to the motor, the additional voltage drop across the cable and the motor terminals may not be detected and the voltage drop may not be compensated which leads to PM motor step out of rotor synchronization with stator. Thus, the conventional scalar V/Hz control technique may not always work for controlling of a PM motor in downhole ESP applications. For example, the scalar control technique may not always operate the motor at or near the motor's highest rated efficiency. Such an approach may be beneficial only when the PM motor of the ESP is operating at certain load capacity. During no load or light loads, the efficiency of the system may be greatly decreased.

Accordingly, there is a need for techniques for controlling a PM synchronous motor in ESP downhole applications that are not too complicated (e.g., easy for technicians to use in the field similar to scalar control) and at the same time operate the PM motor at high efficiency (e.g., saves maximum energy, similar to vector control).

Certain aspects of the present disclosure discuss techniques for controlling operation of a PM synchronous motor in ESP downhole applications. The discussed techniques include techniques for estimating a load angle of the PM motor and adjusting a voltage applied to the PM motor based on the estimated load angle and calculated output power factor of the adjustable speed drive as and when needed in order to maintain operation of the PM motor at or near maximum efficiency of the motor.

In certain aspects, disclosed systems and methods are directed to the control of an electric submersible pump (ESP) system. The ESP system includes an ASD located at an up hole or surface location that drives operation of a PM motor located downhole. The ASD is connected to the PM motor via a step-up transformer and an elongated cable, and a control system controls operation of the ASD.

At least a portion of the control system controls the ASD to optimize the voltage applied at the terminals of the PM motor. In certain aspects, the control system estimates a load angle of the PM motor based at least on currents measured at an output from the ASD. The control system provides dynamic voltage optimization based on the estimated load angle to ensure that the PM motor is operating in an efficient and stable manner. In an aspect, the control system adjusts the voltage applied across the terminals of the PM motor such that the estimated load angle of the PM motor is kept close to a predetermined value or within a range of values (e.g., according to motor rating). Maintaining the load angle of the PM motor at the predetermined value allows the motor to operate at or near the motor's maximum rated efficiency for a varied amount of loads applied to the PM motor. Further, the PM motor may become unstable if the load angle of the motor increases beyond the maximum rated load angle of the motor. In an aspect, maintaining the load angle of the PM motor at the predetermined value also equates to stable operation of the PM motor. This predetermined load angle value may be, for example, 300 or 40°. The predetermined load angle is calculated based on the PM motor rated power, current, impedance, poles, speed etc.

The disclosed systems and methods offer improvements over existing techniques used to control operation of a PM motor in non-ESP applications so the improved techniques can be used to control PM motors used in ESP applications. Generally, the disclosed systems and methods provide the higher efficiency of a vector control scheme with the lower level of system complexity (and therefore increased stability) of a scalar control scheme. When vector control strategies are used to control the ASD of an ESP system, it is imperative to collect accurate measurements at fast speeds so that instability is not introduced to the system. The disclosed systems and methods, however, do not have this problem of instability. The estimated load angle is used to limit the voltage applied to the PM motor to a level where no instability is introduced in the system. In addition, the disclosed systems and methods are able to more efficiently control the voltage of the PM motor than is possible using existing scalar control strategies.

Overall, the disclosed control systems and methods are simple enough that technicians in the field may operate these control systems with little training, and at the same time optimize the voltage applied to the PM motor such that the PM motor operates at high efficiency while maintaining stable motor operation. The disclosed control technique adaptively optimizes the applied voltage from the drive to maintain a high motor efficiency across all operating conditions. Specifically, the control systems and methods disclosed herein can maintain a near unity power factor operation of the PM motor from 25% to 110% of rated load and from 25% to 110% of rated speed.

Turning now to the drawings, FIG. 1 is a schematic block diagram illustrating an electric submersible pump (ESP) system 100 in accordance with presently disclosed embodiments. The ESP system 100 may include, among other things, a 3-phase alternating current (AC) power supply 102, an adjustable speed drive (ASD) 104, a step-up transformer 106, an elongated cable ("long cable") 108, a permanent magnet (PM) motor 110, and a control system 112. As described above, the PM motor 110 may provide torque to a pump member of an ESP assembly (not shown) of the ESP system 100. The ESP assembly including the PM motor 110 may be used in a downhole application for pumping fluids from underground formations. In an aspect, the ESP assembly including the PM motor 110 is at a downhole location and is connected to one end of the elongated cable 108 which extends from the downhole location to the surface where a second end of the cable 108 is connected to the transformer 106. Typically, the 3-phase alternating current (AC) power supply 102, the adjustable speed drive (ASD) 104, the step-up transformer 106 and the control system 112 are located at the surface level.

The ASD 104 may include a low voltage-sinewave adjustable speed drive (not shown). In an aspect, the ASD 104 includes sine wave filters that convert the switching voltages generated from the ASD 104 to sinusoidal smooth waveforms that are communicated through the transformer 106 and the elongated cable 108 to the PM motor 110. The power supply 102 supplies AC power to the ASD 104, which converts the incoming AC power to 3-phase AC power output to drive the PM motor 110. The ASD 104 operates under control of the control system 112, as described in greater detail below, to condition power output toward the PM motor 110. The step-up transformer 106, which is located at or proximate a ground level, increases the output voltage from the ASD 104 so that the 3-phase energy can be transmitted over the long cable 108 to drive the PM motor 110. In an aspect, in an ESP downhole application, the ESP assembly having the PM motor 110 is located thousands of feet (e.g., 10,000 feet or more) in to the downhole, with the elongated cable 108 connecting the PM motor 110 to the ASD 104 at the surface level. The elongated cable 108 generally causes a significant voltage drop as a result of resistance and inductance effects related to the elongated cable 108. Accordingly, for ESP downhole applications the PM motor 110 is chosen to have medium voltage rating (e.g., 2000 volts up to 4000 volts). The step-up transformer 106 is used to convert the low voltages output from the ASD 104 to the required higher voltages before transmitting via the elongated cable 108 to the PM motor 110.

The control system 112 may include a number of components such as, for example, an acceleration/deceleration rate detection component 114, a scalar (Volts (V)/frequency (f or Hz)) control component 116, a PM motor stabilization control component 118, a M,θ→α,β transform component 120, a Clarke transform component 122, and a space-vector pulse width modulation (PWM) component 124. In certain aspects, the control system 112 also includes a dynamic voltage compensation component 126. In an aspect the dynamic voltage compensation component 126 provides load angle-based dynamic voltage optimization and energy savings compared to existing ASD control schemes used to control PM motors.

A general description of the control method will now be described with reference to FIG. 1. A reference speed signal $\omega_{ref}$ is fed in to the acceleration/deceleration rate detection component 114. In an aspect, the reference speed signal $\omega_{ref}$ represents a reference speed/frequency at which the PM motor is desired to be operated. In an aspect, a value of the desired reference speed may be input by an operator using a user interface of the control system 112. The control system 112 may determine the reference speed signal $\omega_{ref}$ based on the operator input. The acceleration/deceleration rate detection component 114 receives the reference speed signal $\omega_{ref}$ and determines an acceleration or deceleration rate for the PM motor 110 based on the desired reference speed and a current speed of the PM motor. The acceleration/deceleration rate detection component 114 outputs a running frequency signal $\omega_{in}$. The running frequency signal $\omega_{in}$ represents a desired frequency or speed of the PM motor.

The scalar V/f (also read as V/Hz) control component 116 receives the running frequency signal $\omega_{in}$ and estimates a voltage to be applied to the PM motor 110 as a function of the desired running frequency which is represented by the running frequency signal $\omega_{in}$. The scalar V/f control component 116 outputs an M signal and a $\theta_{i/p}$ signal. The M signal represents a magnitude of voltage to be applied to the PM motor for achieving the desired reference speed/frequency. The $\theta_{i/p}$ signal is a frequency reference (represented as a degree angle), also referred to as open loop θ, and represents a position of the terminal voltage $V_t$ vector when plotted on a phasor diagram. The M signal and the $\theta_{i/p}$ signal are provided as input to the M,θ→α,β transform component 120. The M,θ →α,β transform component 120 transforms the incoming reference angle $\theta_{i/p}$ and M signals into $V_\alpha$ and $V_\beta$ signals. The $V_\alpha$ and $V_\beta$ signals represent the voltage to be applied to the PM motor 110 in a two-dimensional orthogonal system. The $V_\alpha$ and $V_\beta$ signals are then fed in to the space vector PWM component 124 which generates pulse width modulated signals for the inverter switches (not shown) of the ASD 104 in order to generate the desired 3-phase voltages for the PM motor 110.

The ASD 104 outputs a 3-phase alternating current including current components $I_a$, $I_b$ and $I_c$. As shown, two of the three current components $I_a$ and $I_b$ are measured at the ASD output via sensors 132. The measured signals $I_a$ and $I_b$ are provided as inputs to the Clarke transform component 122. The Clarke transform component 122 transforms the received input signals $I_a$ and $I_b$ from the 3-phase system to the two-dimensional orthogonal system and outputs signals $I_\alpha$ and $I_\beta$. It may be noted that it is not necessary to measure all three currents, since the sum of the three must equal unity. Therefore, the third current must be the negative sum of the first two. The dynamic voltage compensation component 126 receives the current signals ($I_\alpha$ and $I_\beta$) and the voltage signals ($V_\alpha$ and $V_\beta$) and estimates a load angle of the PM motor 110 based on the received current and voltage signals. The dynamic voltage compensation component 126 determines a voltage adjustment value based on the estimated load angle and outputs a ΔM signal which represents the determined voltage adjustment value. The ΔM signal is fed in to the scalar V/f control component 116. The scalar V/f control component 116, as described below, adjusts the estimated magnitude of voltage (M) to be applied to the PM motor based on the ΔM signal before outputting the signal M. In an aspect, the dynamic voltage compensation component 126 also determines an estimated speed $\omega_{est}$ (136) and a power factor cos ϕ (138) of the PM motor 110, which are displayed to an operator or customer to confirm stable and efficient operation of the PM motor.

The PMM stabilization control component 118 receives the signal M, the reference angle $\theta_{i/p}$ signal, and the current signals $I_\alpha$ and $I_\beta$ and outputs a Δω signal. In an aspect, the Δω signal provides counter oscillation to help stabilize the PM motor 110. In an aspect, the scalar V/f control component 116 receives the a Δω signal and, as described below, uses this signal to generate the reference angle $\theta_{i/p}$ signal.

Figure 2A:
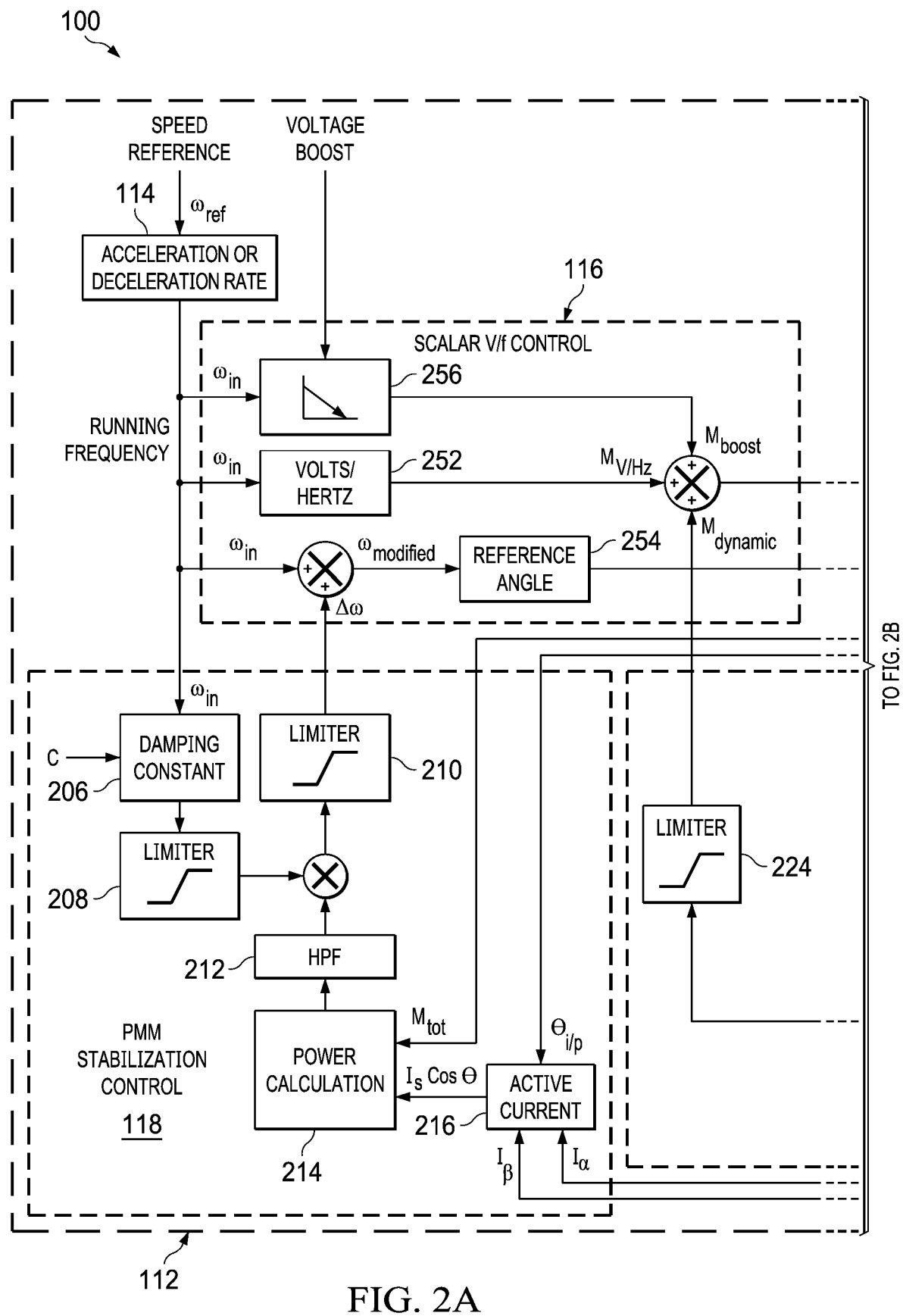
FIGS. 2A and 2B illustrate a schematic block diagram showing detailed components of the ESP system of FIG. 1, in accordance with certain aspects of the present disclosure.
Figure 2B:
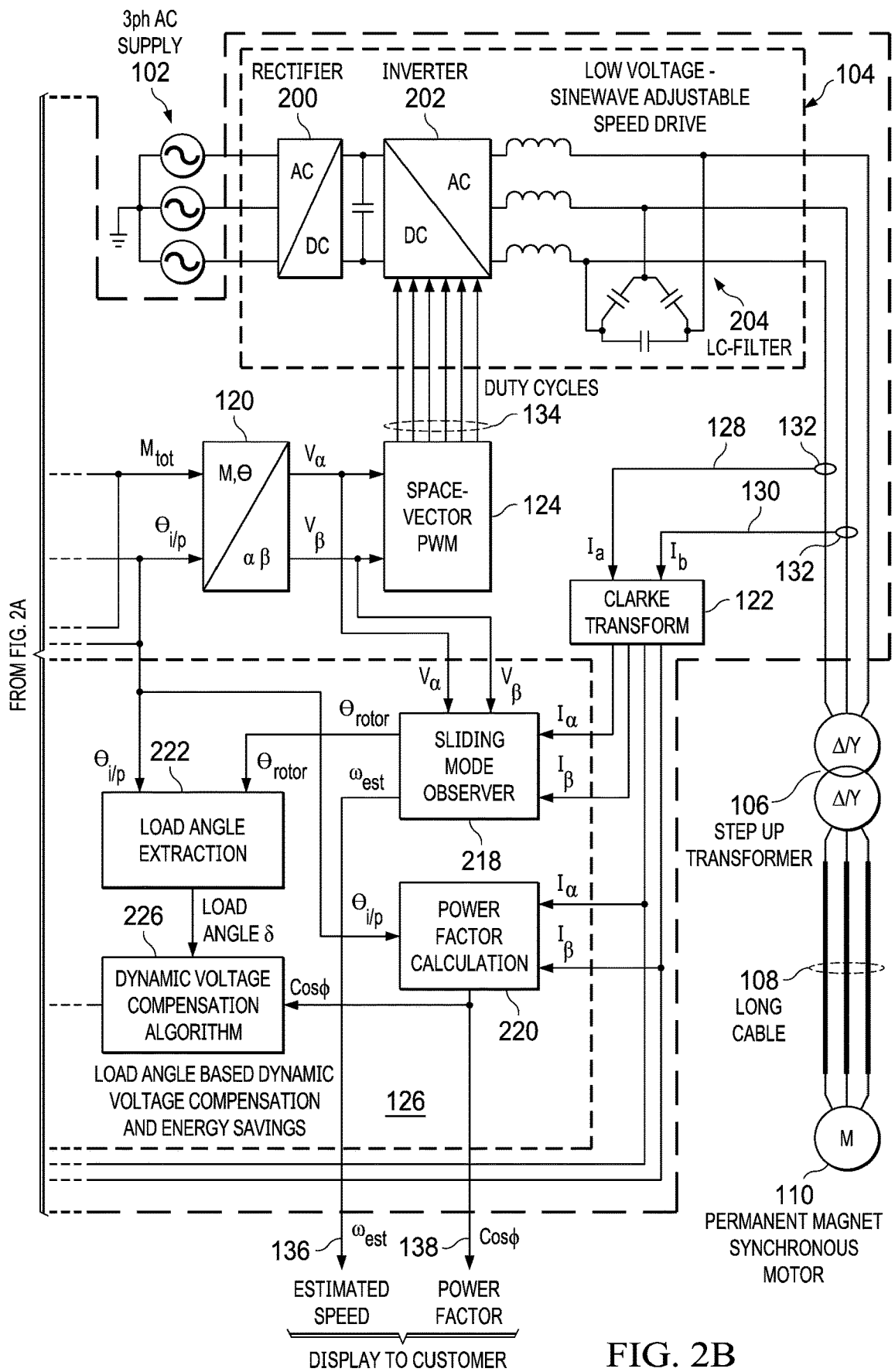

A more detailed schematic diagram of the ESP system 100 is illustrated in FIGS. 2A and 2B. As shown in FIG. 2B, the ASD 104 may include a rectifier 200, an inverter 202, and an LC-filter 204. The inverter 202 may receive the PWM control signals 134 output from the space-vector PWM component 124 of the control system 112. As described above, the space vector PWM component 124 generates pulse width modulated signals for the inverter switches of the inverter 202 in order to generate the desired 3-phase voltages for the PM motor 110.

The scalar V/f control component 116 of the control system 112 may include various components that are connected together as shown in FIG. 2A and used to determine the $M_{tot}$ (read as M-total) signal (i.e., M signal from FIG. 1) from the combined $M_{boost}$, $M_{V/Hz}$, and $M_{dynamic}$ signals, and to determine the reference angle $\theta_{i/p}$ signal, which is indicative of a reference angle. The $M_{V/Hz}$ signal represents a steady state voltage signal and is generated as a function of the running frequency $\omega_{in}$. In an aspect, the $M_V$/Hz signal is a magnitude of voltage that needs to be applied to the PM motor to achieve the desired speed represented by the running frequency $\omega_{in}$. In an aspect, the Volts/Hertz component 252 of the scalar V/f control component 116 receives the running frequency $\omega_{in}$ and estimates steady state voltage $M_{V/Hz}$ as a function of the running frequency $\omega_{in}$. The $M_{boost}$ signal is a voltage boost signal generally applied at startup of the PM motor 110. Generally, PM motors need an extra boost of voltage at startup in order to overcome the initial voltage drop of the combined series resistance of the ESP system which includes the series resistance of the PM motor stator winding, transformer series resistance, and series resistance of the sinewave filter inductor. However, the voltage boost is no more needed after startup and when the motor is running normally. Thus, in an aspect, the voltage boost $M_{boost}$ signal is driven down to zero by component 256 after motor startup. The $M_{dynamic}$ signal is same as the voltage adjustment signal ΔM signal (as shown in FIG. 1) generated by the dynamic voltage compensation component 126. As shown, the $M_{boost}$, $M_{V/Hz}$, and $M_{dynamic}$ signals are combined within the scalar V/f control component 116 before being output as a combined $M_{tot}$ signal.

As shown in FIG. 2A, the running frequency $\omega_{in}$ signal and the Δω signal received from the PMM stabilization control component 118 are added within the V/f control component 116 and a resulting $\omega_{modified}$ signal is fed into a reference angle component 254. The reference angle component 254 receives the $\omega_{modified}$ signal and generates the reference angle $\theta_{i/p}$ signal for output by the V/f control component 116. As described above, the $\theta_{i/p}$ signal is a frequency reference (represented as a degree angle), also referred to as open loop θ, and represents a position of the terminal voltage $V_t$ vector when plotted on a phasor diagram.

The PMM stabilization control component 118 may include various components such as a damping constant component 206, limiters 208 and 210, a high pass filter 212, a power calculation component 214, and an active current component 216 arranged relative to one another as illustrated in FIG. 2A. These components of the PMM stabilization control component 118 are known in the art and will not be described in the present disclosure.

In certain aspects, as shown in FIG. 2B, the dynamic voltage compensation component 126 may include a sliding mode observer component 218, a power factor calculation component 220, a load angle extraction component 222, a limiter 224, and a dynamic voltage compensation algorithm component 226 arranged as illustrated in FIG. 2B. The sliding mode observer component 218 receives the $I_\alpha$ and $I_\beta$ current signals from the Clarke transform component 122. The sliding mode observer component 218 also receives the $V_\alpha$ and $V_\beta$ voltage signals output from the M,θ→α,β transform component 120. In an aspect, based on the received current and voltage signals, the sliding mode observer component 218 estimates a rotor angle $\theta_{rotor}$ and the estimated speed 136 of the PM motor 110. The rotor angle $\theta_{rotor}$ is indicative of a rotor position (e.g., with respect to the stator position of the motor) of the PM motor 110. In an aspect, the rotor angle $\theta_{rotor}$ represents a position of the back electromagnetic field (EMF) vector ($E_f$) of the motor when plotted on a phasor diagram. In an aspect, the estimated speed 136 is output in real time or near real time for display to an operator or customer (e.g., via a display).

The load angle extraction component 222 receives the estimated rotor angle $\theta_{rotor}$ signal and the reference angle $\theta_{i/p}$ signal as determined by the scalar V/f control component 116, and estimates a load angle $\delta$ of the PM motor 110 based on the reference angle $\theta_{i/p}$ and the rotor angle $\theta_{rotor}$. In an aspect, the load angle extraction component 222 estimates the load angle $\delta$ of the PM motor 110 as a difference of the reference angle $\theta_{i/p}$ and the rotor angle $\theta_{rotor}$. The estimated load angle $\delta$ is indicative of an amount of load applied to the PM motor 110. For example, when the amount of load applied to the PM motor 110 decreases, the load angle $\delta$ also decreases. On the other hand, when the amount of load applied to the PM motor 110 increases, the load angle $\delta$ also increases.

As discussed above, the dynamic voltage compensation component 126 provides load angle-based dynamic voltage compensations and energy savings. In an aspect, the dynamic voltage compensation algorithm component 226 adjusts the amount of voltage being applied to the PM motor 110 based on the estimated load angle $\delta$ of the PM motor such that the load angle $\delta$ is maintained at a predetermined value or within a predetermined range of values. In an aspect, the PM motor 110 operates at its highest efficiency (e.g., at or near maximum rated efficiency) when the load angle $\delta$ of the PM motor 110 is maintained at the predetermined value or within a predetermined range of values. As noted above, this predetermined load angle $\delta$ value may be, for example, 300 or 40°. The predetermined load angle is calculated based on the PM motor rated power, current, impedance, poles, speed, etc.

In certain aspects, a decrease in the load angle $\delta$ value indicates that the amount of load on the PM motor 110 has decreased. This indicates that the motor requires reduced current in order to support the reduced load. The reduced current may be supported by a lower voltage, and thus, the voltage applied to the PM motor 110 may be reduced to avoid wastage of power. Thus, upon detecting that the load angle $\delta$ of the PM motor 110 has decreased, the dynamic voltage compensation algorithm component 226 may generate a negative voltage adjustment value in order decrease the voltage applied at the motor terminals and increase the load angle $\delta$ of the motor such that it is within desired limits. The dynamic voltage compensation algorithm component 226 may output the $M_{dynamic}$ voltage adjustment signal representing the positive voltage adjustment.

On the other hand, an increase in the load angle $\delta$ value indicates that the amount of load on the PM motor 110 has increased. This indicates that the motor requires a higher current in order to support the increased load. Generally, when the amount of load applied to the motor is increased, the motor starts drawing additional current which leads to a voltage drop across the motor terminals. This voltage drop needs to be compensated so that the load angle $\delta$ of the motor is maintained within desired limits and motor stability is preserved. In an aspect, if the load angle $\delta$ increases beyond a certain limit, the motor may lose synchronization and lose stability. Thus, upon detecting that the load angle $\delta$ of the PM motor 110 has increased, the dynamic voltage compensation algorithm component 226 may generate a positive voltage adjustment value in order increase the voltage applied at the motor terminals and decrease the load angle $\delta$ of the motor such that it is within desired limits. The dynamic voltage compensation algorithm component 226 may output the $M_{dynamic}$ voltage adjustment signal representing the positive voltage adjustment.

In certain aspects, the power factor calculation component 220 may receive the $I_a$ and Ig current signals from the Clarke transform component 122. The power factor calculation component 220 may also receive the reference angle $\theta_{i/p}$ signal output from the scalar V/f control component 116. As described above, the reference angle $\theta_{i/p}$ is indicative of the terminal voltage $V_t$ applied to the PM motor. The power factor calculation component 220 calculates the power factor cos $\phi$ 138 based on these received signals. In an aspect, the power factor cos $\phi$ 138 is output in real time or near real time to an operator or customer (e.g., via a display).

In certain aspects, the PM motor 110 efficiency can be related to a maximum torque per ampere value of the motor. More particularly, if a PM motor is a salient pole motor then maximum efficiency can be obtained by running the PM motor in a maximum torque per ampere region. Generally, when the motor is running in a torque per ampere value range that is closer to this maximum torque per ampere value, then the PM motor is running at or near high efficiency. The power factor cos $\phi$ 138 parameter is indicative of the efficiency of operation of the PM motor. Thus, the power factor cos $\phi$ 138 of the PM motor may be estimated by the power factor calculation component 220 in order to estimate the level of efficiency at which the PM motor is operating. When the power factor is closer to unity value, the salient pole PM motor may be determined as operating near the maximum torque per ampere value region of the PM motor. Since this operation can be compared to the vector control of PM motor with positive Q-axis current and negative D-axis current in the DQ axis synchronous reference frame which leads to operating the PM motor at its maximum torque per ampere region.

In certain aspects, the estimated rotor angle $\theta_{rotor}$ may not always be an accurate estimation of the motor's rotor position as it is a sensorless estimation (e.g., not measured by a sensor at the motor). Thus, the load angle $\delta$ estimated based on the estimated rotor angle $\theta_{rotor}$ may not always be an accurate representation of the motor's actual load angle. Thus, a voltage adjustment determined based only on the estimated load angle may not cause the motor to run at its highest efficiency.

In certain aspects, in order to ensure that the operation of the PM motor is maintained at its highest rated efficiency, the voltage adjustments may be determined based on a combination of the estimated load angle $\delta$ and the power factor cos $\phi$ of the motor indicative of the efficiency at which the motor is currently operating.

Accordingly, in certain aspects, the dynamic voltage compensation algorithm component 226 may additionally receive the power factor cos (138, and may determine the $M_{dynamic}$ voltage adjustment signal based on the calculated power factor cos 0138 and the estimated load angle S. In an aspect, the dynamic voltage compensation algorithm component 226 determines voltage adjustments so that the motor operates closer to unity power factor, thus ensuring that the motor operates at its maximum rated efficiency. In an aspect, if the calculated power factor cos $\phi$ is closer to unity, there may be little or no voltage adjustments.

When the estimated load angle δ of the motor increases and if the power factor cos φ is leading, for example, increases to a value higher than unity power factor, this triggers the dynamic voltage compensation algorithm component 226 to provide a positive voltage adjustment in order to increase the voltage applied to the motor and decrease the load angle δ so that the motor operates closer to unity power factor cos φ (e.g., closer to maximum efficiency).

When the estimated load angle δ of the motor decreases and if the power factor cos φ is lagging, for example, falls much lesser than unity, this triggers the dynamic voltage compensation algorithm component 226 to provide a negative voltage adjustment in order to reduce the voltage applied to the motor and increase the load angle δ so that the motor operates closer to unity power factor cos φ (e.g., closer to maximum efficiency).

Accordingly, by adjusting the voltage applied to the PM motor 110 based on a combination of the estimated load angle and the calculated power factor of the motor, the control system 112 ensures that the PM motor 110 is operated closest to its maximum rated efficiency.

In certain aspect, as described above, the magnitude of the voltage adjustment is a function of at least one of load angle δ, the power factor cos p or a combination thereof.

In certain aspects, a large instantaneous voltage adjustment (e.g., a large value of $M_{dynamic}$) may adversely affect the operation of the PM motor 110. Thus, the limiter component 224 may be used to limit a magnitude of instantaneous voltage adjustment and ensure that a larger voltage adjustment is applied gradually to the motor.

In certain aspects, the dynamic voltage compensation algorithm 226 may select a lowest possible amount of voltage compensation that keeps the load angle close to a predetermined limit. This way, the calculated voltage compensation leads to efficient (according to the power factor 138) and stable (according to the load angle) operation of the PM motor 110. The control system 112 may control the voltage output by the ASD 104 to operate the PM motor 110 in a stable mode (i.e., according to the load angle δ estimate). In addition, the control system 112 may reduce the voltage whenever possible to ensure the system is operating relatively efficiently (i.e., according to the power factor—keeping the power factor 138 between 0.95 and unity). The control system 112 may control the ASD 104 to keep the voltage compensation as low as possible while still reaching the desired load angle limit.

In certain aspects, the control system 112 continually estimates the load angle δ of the PM motor 110 when the motor is running, and adjusts the voltage applied to the motor as and when needed in order to maintain stable operation of the PM motor 110 at or near the motor's maximum rated efficiency (e.g., at or near unity power rating).

Figure 3:
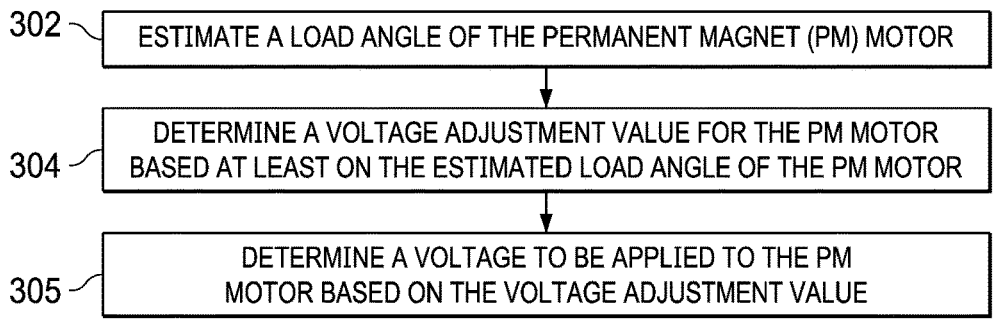
FIG. 3 illustrates example operations performed by a control system for voltage optimization of a PM synchronous motor, in accordance with certain aspects of the present disclosure.

FIG. 3 illustrates example operations 300 performed by a control system for voltage optimization of a PM synchronous motor, in accordance with certain aspects of the present disclosure.

Operations 300 begin, at 302, by estimating a load angle of the PM motor.

At 304, a voltage adjustment value is determined for the PM motor based at least on the estimated load angle of the PM motor.

At 306, a voltage to be applied to the PM motor is determined based on the voltage adjustment value.

Figure 4:
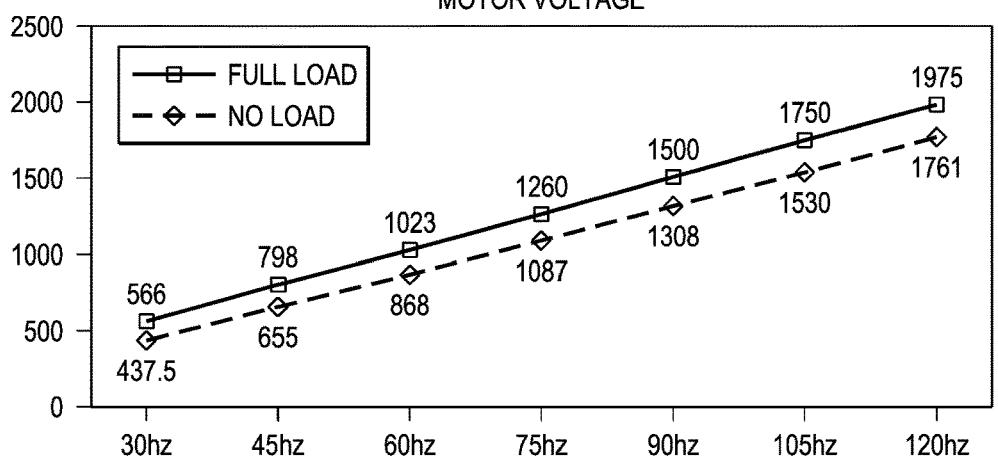
FIG. 4 is a plot of motor voltage vs. speed of the PM motor in the ESP system of FIG. 1 operated at no load and full load, in accordance with certain aspects of the present disclosure.

FIG. 4 illustrates a plot 400 of motor voltage vs. motor speed available using the disclosed control system to control operation of a PM motor. The plot 400 shows two trend lines, one corresponding to the operation at the motor's full rated load at different frequencies and the other corresponding to the operation at no load at different frequencies. As illustrated, the full load and no load measurements show the difference in voltage applied to motor at no-load condition and at full load condition for a particular operating frequency. The difference in voltage is the voltage drop caused by the long cable due to load current. The plot 400 also illustrates that the dynamic voltage compensation technique accordingly adjusts the output voltage when the load is applied and removed, and keeps the PM motor running at or near maximum efficiency region.

Figure 5:
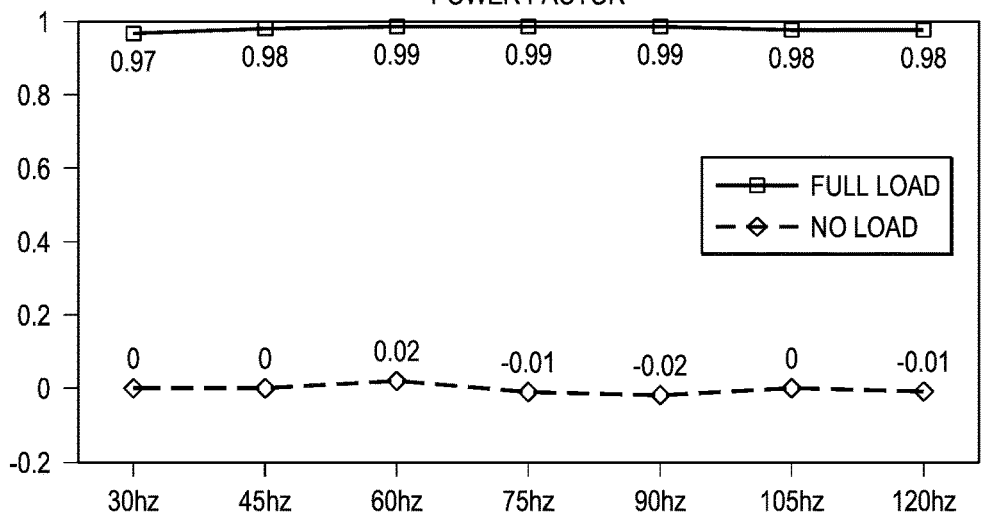
FIG. 5 is a plot of calculated power factor vs. speed of the PM motor in the ESP system of FIG. 1 operated at no load and full load, in accordance with certain aspects of the present disclosure.

FIG. 5 illustrates a plot 500 of power factor vs. motor speed available using the disclosed control system to control operation of a PM motor. The plot 500 shows two trend lines, one corresponding to the operation at the motor's full rated load and the other corresponding to the operation at no load. As illustrated, at all motor speeds the full load power factor is maintained in a desired range between 0.95 and unity (1), meaning that the motor is operating efficiently. FIGS. 4 and 5 therefore demonstrate the ability of the disclosed control system to control operation of a PM motor of an ESP to keep the motor operation both stable and efficient.

The following Tables 1, 2, and 3 detail the PM motor performance available using the disclosed control system and method. Table 1 illustrates the rated performance for the PM motor. Table 2 shows the performance of the PM motor under the disclosed control scheme when motor performance is at 100% speed and 100% load. Table 3 shows the performance of the PM motor under the disclosed control scheme when motor performance is at 100% speed and 110% load. These Tables demonstrate that the PM motor can be operated with efficiency and stability under a range of conditions using the ASD controlled via the disclosed control system and method.

TABLE 1

Motor Rating from Data Sheet

| | |
|---|---|
| Voltage rating | 1875 V |
| Current | 33 A |
| Rated power | 90 Kw (107 kVA) |
| Rated power factor | 0.85 |

TABLE 2

Motor Performance at 100% speed and 100% load

| | |
|---|---|
| Voltage | 1875 V |
| Current | 31.8 A |
| Motor I/P Power | 101.3 Kw (103.2 kVA) |
| Load Torque | 238 NM |
| Power factor | 0.981 (near unity) |
| Motor efficiency | 88.2 (name plate eff = ~88%) |

TABLE 3

Motor Performance at 100% speed and 110% load

| | |
|---|---|
| Voltage | 1934 V |
| Current | 31.8 A |
| Motor I/P Power | 106.3 Kw (106.66 kVA) |
| Load Torque | 254 NM |
| Power factor | 0.9965 (unity) |
| Motor efficiency | 90.373 (name plate eff = ~88%) |

What is claimed is:

1. A system comprising:
an electric submersible pump (ESP) comprising a permanent magnet (PM) motor;
an adjustable speed drive (ASD) for powering the PM motor;
a step-up transformer connected to an output of the ASD, the step-up transformer converting the a low voltage output from the ASD into a higher voltage output to be applied to the PM motor;
an elongated electric cable extending between the step-up transformer and the ESP, the cable carrying electric power from the step-up transformer to the PM motor; and
a control module for controlling an amount of voltage applied to the PM motor, wherein the control module comprises:
a load angle extraction component configured to estimate a load angle of the PM motor;
a dynamic voltage compensation component configured to determine a voltage adjustment value for the PM motor based at least on the estimated load angle of the PM motor; and
a scalar control module configured to determine a voltage to be applied to the PM motor based on the voltage adjustment value.

2. The system of claim 1, wherein the control module further comprises:
a sliding mode observer component configured to estimate a rotor angle of the PM motor, wherein the rotor angle corresponds to an induced electromagnetic field (EFM) within the PM motor,
wherein the load angle extraction component is configured to obtain an open loop reference angle of the PM motor, wherein the reference angle corresponds to a terminal voltage of the PM motor,
wherein the load angle extraction component is configured to calculate the load angle as a difference between the open loop reference angle and the rotor angle.

3. The system of claim 2, wherein the sliding mode observer component is configured to estimate the rotor angle of the PM motor based on a current being applied to the PM motor and a voltage being applied to the PM motor.

4. The method of claim 2, wherein the sliding mode observer is further configured to determine an estimated speed of the PM motor based on a current being applied to the PM motor and a voltage being applied to the PM motor.

5. The system of claim 1, further comprising:
a power factor calculation component for estimating a power factor related to the PM motor, wherein the power factor is indicative of a level of efficiency of operation of the PM motor.

6. The system of claim 5, wherein the dynamic voltage compensation component is configured to determine the voltage adjustment value for the PM motor based on a combination of the estimated load angle and the estimated power factor.

7. The method of claim 5, wherein the power factor calculation component calculates the power factor based on a current being applied to the PM motor and an open loop reference angle of the PM motor, wherein the reference angle corresponds to a terminal voltage of the PM motor.

* * * * *